Feb. 16, 1932.  R. E. COURTRIGHT  1,845,582
SPECTACLE TEMPLE HINGE
Filed July 15, 1930
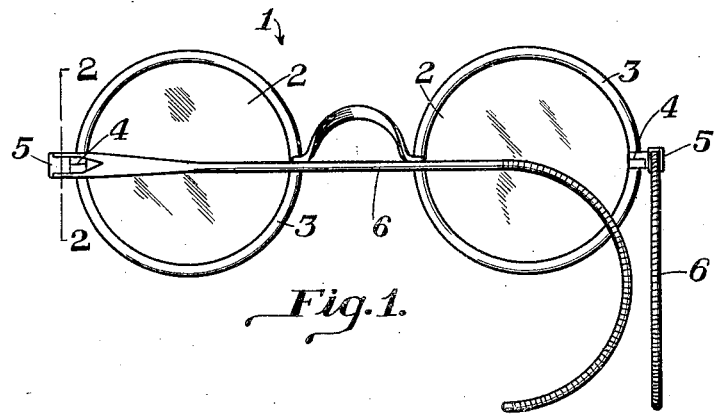
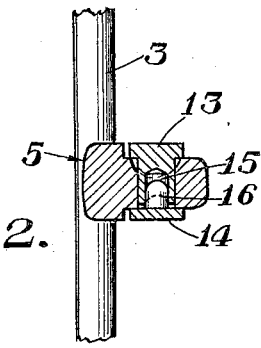
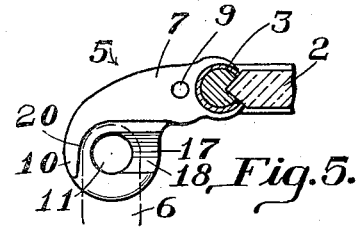
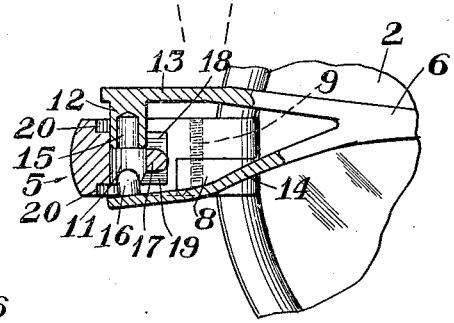
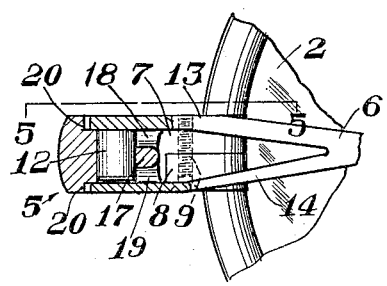
Inventor
Robert E. Courtright
By  W. S. McDowell
Attorney Patented Feb. 16, 1932

1,845,582

UNITED STATES PATENT OFFICE

ROBERT E. COURTRIGHT, OF COLUMBUS, OHIO

SPECTACLE TEMPLE HINGE

Application filed July 15, 1930. Serial No. 468,060.

This invention relates to an improved hinge construction and is particularly directed for use in connection with an eyeglass or spectacle temple for connecting the same with the lens or frame therefor.

The principal object of the invention resides in the provision of a hinge construction or mounting of the above designated character which permits the easy and quick removal of the temples from the lenses and the attachment thereto for swinging movement relative to the lenses and wherein the usual screws forming the pivot pins for the temples and other separate fastening means are eliminated.

Another object of the invention is to provide the temples with split ends carrying rigidly and integrally formed pintles and means for locking or retaining the pintles in hinged relationship with the lenses, the pintles being inserted for their pivoted movement within bearing openings formed in the lens frames by the mere spreading of the split ends to a slight degree and held in place by closing the said ends into contact with the bearings for the pintles.

A further object of the invention is to provide a hinge mounting between an eyeglass lens and the temple therefor and wherein the construction of the hinged end of the temple is such that the same may be used on the right or left side, thus adding to the simplicity of the device and eliminating the necessity of carrying a large stock of temples on hand.

A still further object of the invention is to provide a hinged mounting which is of extremely simple, durable and reliable construction and one which is comparatively cheap and economical to manufacture.

With these and other objects in view, which will appear as the description proceeds, the invention consists in the novel features of construction, combination of elements and arrangement of parts hereinafter to be more fully described and pointed out in the appended claims.

In the accompanying drawings:

Figure 1 is a side elevation of a pair of spectacles formed in accordance with the present invention, Figure 2 is a vertical transverse sectional view taken through one of the hinge mountings on the line 2—2 of Figure 1, Figure 3 is a longitudinal sectional view taken through the hinge and discloses more in detail the manner in which the temples are attached to the lens frames, Figure 4 is a similar view showing the temple and its hinge mounting in an operative position, Figure 5 is a horizontal sectional view taken on the line 5—5 of Figure 4 with the temple shown in dotted lines.

Referring more particularly to the drawings the numeral 1 designates the eyeglasses in their entirety and which includes the lenses 2 of conventional form held clamped in this instance within the frames 3. The frames 3 may be of the contractible type and split along their outer ends as at 4 to permit of the insertion of the lenses 2. Formed with the split ends of the frames 3 are end pieces which are generally indicated by the numeral 5 and to which the temples 6 are pivotally connected. Each of the end pieces 5 is formed to include a pair of outwardly directed extensions 7 and 8. Connecting the extensions 7 and 8 is a screw 9 by which the frame is contracted to hold the lens therein in rigid relation with the frame member. The extension 7 of each end piece 5 is formed with a rearwardly directed portion 10 in which is formed on opening 11. Adapted to be received within the opening 11 is the pintle 12 formed integrally with the inner end of the temple 6. This end of the temple is split longitudinally for a considerable distance to form a pair of fingers 13 and 14 and with the former of which the pintle 12 is formed. The pintle 12 is inwardly directed from the finger 13 and provided with an open ended bore 15 for the reception of a projection 16 formed with the finger 14.

In attaching the temples to the end pieces 5 the fingers 13 and 14 are spread apart a sufficient distance to clear the reduced rib 17 formed by grooving the upper and lower surfaces of the rearwardly directed portion 10 of the end piece 5 forming channels 18 and 19 therein. The channels 18 and 19 serve as guides for the pintle 12 and the projection 16 for directing the same within the opening 11 and in axial alignment therewith whereby upon closing or applying inward pressure to the outer ends of the fingers 13 and 14 the projection 16 will enter the bore 15 and serve to lock the temple in place within the end piece 5. It will be noted that the channels 18 and 19 are directed toward and parallel with the inner surface of the lens. Thus, when the temples are swung outwardly to an active position the strain on the pintles 12 will be taken up by the heavy or larger portion of the bearing. The finger 13 which carries the pintle 12 may be formed heavier in cross-sectional area than the finger 14 so as to hold the pintle in perpendicular relationship with respect to the finger and prevent bending of the latter when subjected to stresses and strains imparted thereto under ordinary conditions. Also, as the pintles 12 are of a length equal to the depth of the openings or bearings 11 the strains will be distributed over the full area of the bearings. The temples 6 which are made of comparatively soft metal or alloy commonly employed in structures of this kind permit of the easy spreading and closing of the fingers, and as the fingers 14 are made lighter than the cooperating fingers 13 the same may be readily bent without the danger of breaking during the withdrawal of the locking projections 16 from the bores 15 and subsequent removal of the temples from the end pieces 5.

The upper and lower faces of the end pieces 5 may also be formed with shoulders 20 with which the fingers 13 and 14 of the temples engage and which shoulders act as stops for the temples when swung to the outward position for use to support the glasses upon the wearer. By the novel construction of the end pieces 5 and the hinged ends of the temples 6, the temples may be used right or left, which is a highly desirable feature in that it eliminates the necessity of maintaining a large stock of temples on hand.

From the foregoing description taken in connection with the accompanying drawings it will be seen that a hinge mounting for spectacle temples has been provided which is of extremely novel and simple construction and one which provides for the easy and quick removal and attachment thereof to a pair of eyeglasses.

Although the pintles 12 and the projections 16 have been described as formed integrally with the fingers 13 and 14, it will be understood that the same may be formed separately and attached to the fingers by soldering or brazing the same thereto. Other slight variations may be made also, and therefore I do not desire to limit myself to the precise construction shown in the drawings.

What is claimed is:

1. A hinge mounting for eye glass temples comprising end pieces carried by the glasses and provided with bearing openings therein, the temples having one of their ends split to provide a pair of longitudinally extending fingers, a pintle formed upon one of said fingers having its length approximately that of the bearing openings formed in said end pieces, said pintle having an open ended bore formed therein, and a projection formed upon the other of said fingers and adapted to enter the bore in said pintle for locking the temples in place upon the closing of said fingers.

2. In a pair of eye glasses having end pieces thereon provided with bearing openings, each of said end pieces being also provided with a pair of inwardly directed guide grooves in the upper and lower surfaces thereof, temples having one of their ends split into a pair of longitudinally extending fingers, one of which is provided with a pintle adapted to enter one of said bearing openings which is of a length approximately equal to the length of said bearing opening, said pintle being provided with a bore at its outer end, and a projection formed upon the other of said fingers and adapted to enter said bore upon the closing of said fingers to hold the pintle in a locked position within said bearing, said guide grooves serving upon the positioning of the temples in place to guide said pintle and projection into position within said bearing openings.

3. A hinge mounting for eye glass members comprising end pieces carried by the eye glass and provided with vertically arranged bearing openings therein, temples having one of their ends split to provide longitudinally extending fingers, a pintle formed integral with one of said fingers and having a length substantially equal to the length of one of said bearing openings, said pintle being provided with a longitudinally extending bore at the outer end thereof, and a projection formed integral with the other of said fingers and adapted to enter said bore to hold the pintle in place within said bearing opening upon the collapse of said fingers.

In testimony whereof I affix my signature.

ROBERT E. COURTRIGHT.